J. P. HEDSTROM.
RETOOTHING MACHINE.
APPLICATION FILED FEB. 29, 1908.
953,692.
Patented Apr. 5, 1910.
2 SHEETS—SHEET 1.
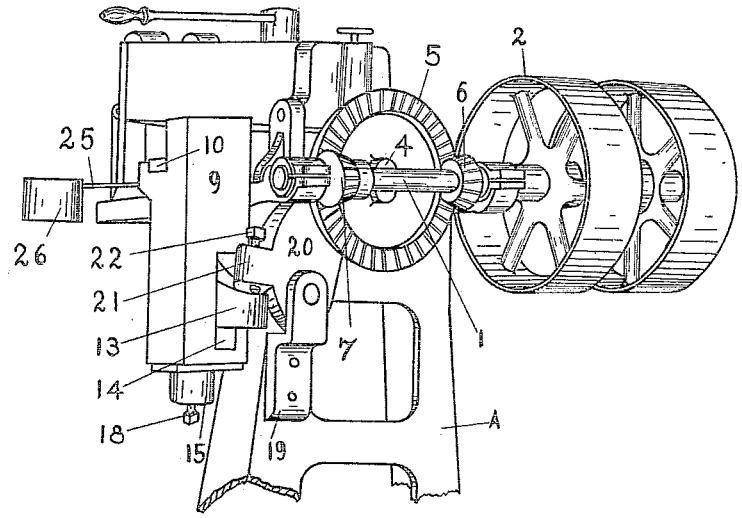
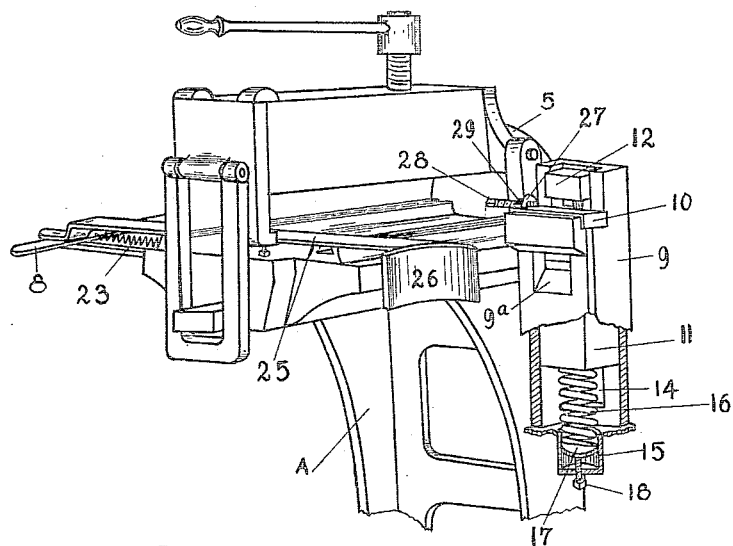
WITNESSES:
J. Ray Abbey
Ralph S. Warfield
INVENTOR
John P. Hedstrom
BY
Geo. B. Willer
ATTORNEY J. P. HEDSTROM.
RETOOTHING MACHINE.
APPLICATION FILED FEB. 29, 1908.
953,692.
Patented Apr. 5, 1910.
2 SHEETS—SHEET 2.
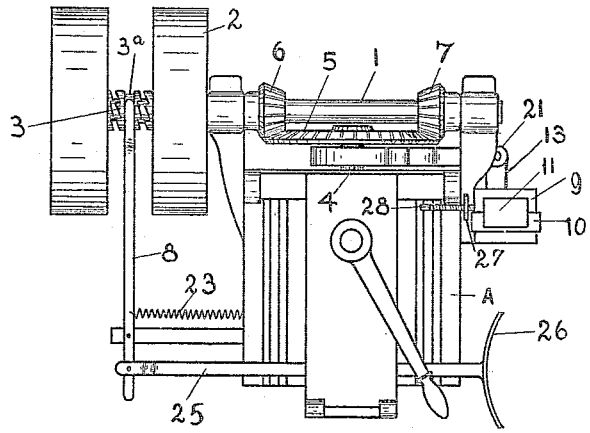
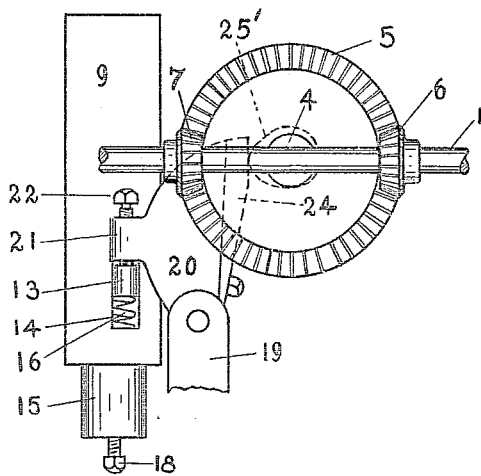
WITNESSES:
J. Ray Abbey
Ralph S. Warfield
INVENTOR
John P. Hedstrom
BY
Geo. B. Willcox
ATTORNEY

UNITED STATES PATENT OFFICE.

JOHN P. HEDSTROM, OF BIG RAPIDS, MICHIGAN, ASSIGNOR TO HANCHETT SWAGE WORKS, OF BIG RAPIDS, MICHIGAN, A CORPORATION OF MICHIGAN.

RETOOTHING-MACHINE.

953,692.     Specification of Letters Patent.     Patented Apr. 5, 1910.

Application filed February 29, 1908. Serial No. 418,607.

*To all whom it may concern:*

Be it known that I, JOHN P. HEDSTROM, a citizen of the United States, residing at Big Rapids, in the county of Mecosta and State of Michigan, have invented certain new and useful Improvements in Retoothing-Machines; and I do hereby declare the following to be a full, clear, and exact description of the invention, such as will enable others skilled in the art to which it appertains to make and use the same.

This invention relates to the combination of a toothing mechanism with a saw stretching machine, the objects of which are to simplify the construction and at the same time obtain a more powerful device.

Another object is the provision of means for gaging the feed of the saw, in order that the teeth may be formed regularly on the saw.

It frequently happens in saw toothers, as formerly constructed, that the operator would feed the saw too far or not far enough perhaps, and the punch would form a tooth before the operator could stop the machine.

It is one object of my invention to provide means under constant control of the operator, which will permit him to stop the mechanism at any point, this being accomplished by obviating the use of gears.

To these and other ends, therefore, my invention consists in certain novel features and combinations such as will be more fully described hereinafter and particularly pointed out in the claims.

In the accompanying drawings, Figure 1 is a perspective view of a saw stretching machine equipped with my invention, part of the casing being broken away, Fig. 2 is a similar view of the opposite side of the machine, Fig. 3 is a top plan view, and Fig. 4 is a detail view showing the lever arrangement.

Referring to the drawings, A indicates the frame of the machine equipped with the usual horizontally extending drive shaft 1 on which is a drive pulley 2 and a clutch mechanism 3. A countershaft 4 carrying the stretching rolls, not shown, is provided, such countershaft having a bevel gear 5 fast thereon, with which bevel gear the bevel pinions 6 and 7 on the drive shaft 1 mesh, the pinion 7 being loose on the shaft. The movable member $3^a$ of the clutch is controlled by a shifting lever 8.

Secured upon the frame A and adjacent the shaft 4 is mounted a vertical hollow casing 9 apertured as at $9^a$ (Fig. 1) to discharge the scrap material punched from the saw. Near the upper end of the casing and across the aperture $9^a$ is located a die plate 10 and within the casing slides a plunger 11, one side of which is recessed to provide an overhang 12, to which the die is secured.

In prior machines of this description it has been customary to provide gearing for operating the plunger, such gearing being driven from shaft 1. I obviate the use of gearing entirely by using the following means for reciprocating the plunger. I provide the lower end of the plunger with a tail 13 (Fig. 2) extending out through a slot 14 in the casing, the slot being of sufficient length to allow the plunger to reciprocate freely.

Within the casing at its lower end I form a seat 15 adapted to receive a suitable spring 16, the spring resting at its lower end upon a plate 17 adjustable by a set screw 18 depending beneath the closed lower end of the casing. The plunger is normally supported at its upward limit of movement by the spring 16 on which it rests.

Pivotally secured to a bracket 19 carried by the frame A is a rocking lever 20, having a laterally projecting arm 21 which overlaps the tail piece 13 of the plunger and may engage the same directly though I have shown the arm 21 provided with a set screw 22, the adjustment of which determines the position of the overhang 12 of the die carrier relative to the stationary die plate 10. The free end of the lever is faced with a wearing shoe 24 constituting a portion thereof, the upper end of which shoe is adapted to be wiped by a cam 25' secured to the counter-shaft 4 behind the bevel gear 5. It is obvious that as the cam wipes against the shoe, it will rock the lever 20 to cause the arm 21 to press downward upon the tail piece and depress the die carrier against the tension of the spring 16. As the cam leaves the shoe, the tension of the spring becomes operative to raise the die carrier and rock the lever back to its original position.

As heretofore noted, in former machines it was difficult to stop the die carrier instantly for the reason that in some instances the clutch was on the opposite side of the machine from the operator and again because the gearing would not admit of an instantaneous stoppage, but would continue to actuate the carrier through their own inertia, even after the clutch had been released. I have devised a means for controlling both stretcher and toother from a single clutch and moreover, my mechanism for operating the toother cannot accumulate enough inertia to operate the die carrier after the drive shaft has been disconnected from the power. In other words, the die carrier will instantly stop in any position that it happens to be when the power is thrown off.

In order to place the control of the machine in the hands of the operator so that he may instantly start or stop the mechanism, I attach one end of a retracting spring 23 near the free end of the shifting lever 8, the opposite end of the spring being secured to the frame, the tendency of which spring is to automatically throw the clutch out and cause an instant stoppage of the machine. To retain the clutch in locked position, I secure one end of a hip lever 25 to the shifting lever 8, the hip lever extending across the machine and having a shield 26 against which the operator leans when the clutch is to be thrown in, the shield being about the height of the hip of the operator and the latter stands with his hip against the shield to retain the clutch in engagement with its coöperating member. When the operator desires to start the machine, he merely shifts his weight to the foot farthest from the machine which will cause his hip to sway away from the shield and permit the spring 23 to operate the shifting lever to throw the clutch out. This movement can be accomplished easily and rapidly and the machinery will stop as soon as the clutch is released. Obviously to throw the clutch in, all that is necessary is to lean against the hip lever which will move the shifting lever against the tension of spring 23.

In operating a toother it is of the utmost importance that the teeth be spaced apart evenly to accomplish which I provide a gage 27 comprising a disk threaded upon a stud 28 projecting horizontally from the casing 9, a lock nut 29 serving to prevent the accidental displacement of the disk after adjustment.

The points of the teeth of the saw, as they are cut are successively brought into contact with the disk, the distance between the points being determined by the distance between the disk and the die. The edge of the disk is received between the points of the teeth, the point of each successive tooth engaging the disk.

Having thus fully disclosed my invention, what I claim as new, is:—

1. A toother for saws, comprising a casing having a slot therein, a die carrier slidingly received in the casing, a lateral projection from the die carrier extending through the slot, means normally tending to retain the die carrier in raised position, a shaft spaced apart from the projection, a cam on the shaft, a rocking lever interposed between the cam and projection, and an arm carried by the lever and extending into proximity to and engaging the projection for transmitting motion from the cam to the projection to forcibly depress the die carrier.

2. In a saw toother, a slidingly mounted die carrier, a compressible spring tending to retain the die carrier in raised position, means for adjusting the tension of said spring, a revoluble cam, a rocking lever interposed between the cam and die carrier, and an arm carried by said lever, adapted to forcibly depress the die carrier.

3. In a saw toother, a slidingly mounted die carrier, a lateral projection on said die carrier, a compressible spring tending to retain the die carrier in raised position, means for adjusting the tension of said spring, a revoluble cam, a rocking lever interposed between the cam and projection, an arm carried by said lever, adapted to engage said projection to forcibly depress the die carrier, and an adjusting screw carried by said arm.

In testimony whereof, I affix my signature in presence of two witnesses.

JOHN P. HEDSTROM.

Witnesses:
RAY L. SWIFT,
LOUIS B. HANCHETT.